United States Patent
Hirota et al.

(10) Patent No.: US 11,018,407 B2
(45) Date of Patent: May 25, 2021

(54) ELECTRONIC DEVICE

(71) Applicant: TOSHIBA CLIENT SOLUTIONS CO., LTD., Tokyo (JP)

(72) Inventors: Toshiyuki Hirota, Tokyo (JP); Takeshi Iwata, Tokyo (JP); Kazuya Fukushima, Tokyo (JP); Yusuke Sugiura, Tokyo (JP); Tomomi Murayama, Tokyo (JP); Shogo Maeshima, Tokyo (JP); Tomofumi Miyamoto, Tokyo (JP); Shingo Koide, Tokyo (JP); Hikaru Hirata, Toyko (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 223 days.

(21) Appl. No.: 16/233,453

(22) Filed: Dec. 27, 2018

(65) Prior Publication Data
US 2020/0099121 A1    Mar. 26, 2020

(30) Foreign Application Priority Data
Sep. 20, 2018  (JP) .............. JP2018-175920

(51) Int. Cl.
| H01Q 1/22 | (2006.01) |
| H01Q 1/42 | (2006.01) |
| H01Q 1/52 | (2006.01) |

(52) U.S. Cl.
CPC .......... *H01Q 1/2266* (2013.01); *H01Q 1/42* (2013.01); *H01Q 1/52* (2013.01)

(58) Field of Classification Search
CPC .......... H01Q 1/2266; H01Q 1/42; H01Q 1/52; H01Q 1/2258; H01Q 1/243
See application file for complete search history.

(56) References Cited

U.S. PATENT DOCUMENTS

| 2010/0302109 A1 | 12/2010 | Takezaki | |
| 2014/0361932 A1* | 12/2014 | Irci | H01Q 21/28 343/702 |
| 2015/0009076 A1* | 1/2015 | Jang | H01Q 1/2266 343/702 |

(Continued)

FOREIGN PATENT DOCUMENTS

| JP | 2004-088360 A | 3/2004 |
| JP | 3618652 B2 | 2/2005 |
| JP | 2010-011405 A | 1/2010 |

(Continued)

*Primary Examiner* — Robert Karacsony
(74) *Attorney, Agent, or Firm* — Knobbe, Martens, Olson & Bear, LLP

(57) ABSTRACT

According to a notebook-sized personal computer of an embodiment, a base housing retains an arithmetic unit, an antenna having antenna elements, and covers. An LCD housing retains an LCD. Hinges rotatably couple the base housing and the LCD housing to each other. In the base housing, a pair of depression sections are formed by depressing both ends of one side thereof. In each of the pair of depression sections, an antenna element is accommodated. On the base housing, to end sections respectively adjacent to the pair of depression sections along the one side of the base housing, the hinges are respectively provided. The covers respectively accommodate each of the antenna elements, and are constituted of a material through which a radio wave is passed.

19 Claims, 6 Drawing Sheets

(56) References Cited

U.S. PATENT DOCUMENTS

2015/0255851 A1* 9/2015 Guterman ............ H05K 1/0215
                                                    343/702
2019/0237848 A1* 8/2019 Ramasamy ........... G06F 1/1677

FOREIGN PATENT DOCUMENTS

JP    2010-278901 A    12/2010
JP    2015-018524 A     1/2015

* cited by examiner

ELECTRONIC DEVICE

CROSS-REFERENCE TO RELATED APPLICATIONS

This application is based upon and claims the benefit of priority from Japanese Patent Application No. 2018-175920, filed Sep. 20, 2018, the entire contents of which are incorporated herein by reference.

FIELD

Embodiments described herein relate generally to an electronic device.

BACKGROUND

A technique for providing an antenna for communication in an electronic device is known. Regarding the above-mentioned technique, in a conventional literature, a configuration in which an antenna element is provided in such a manner as to outwardly protrude from an end section of a device main body is disclosed. In another conventional literature, a configuration in which an antenna is provided in such a manner as to be accommodated in a part in the vicinity or the like of a hinge section of a notebook-sized personal computer is disclosed.

An embodiment described herein aims to provide an electronic device capable of being simply and easily configured and downsized, and obtaining an excellent communication state.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Figure 1:
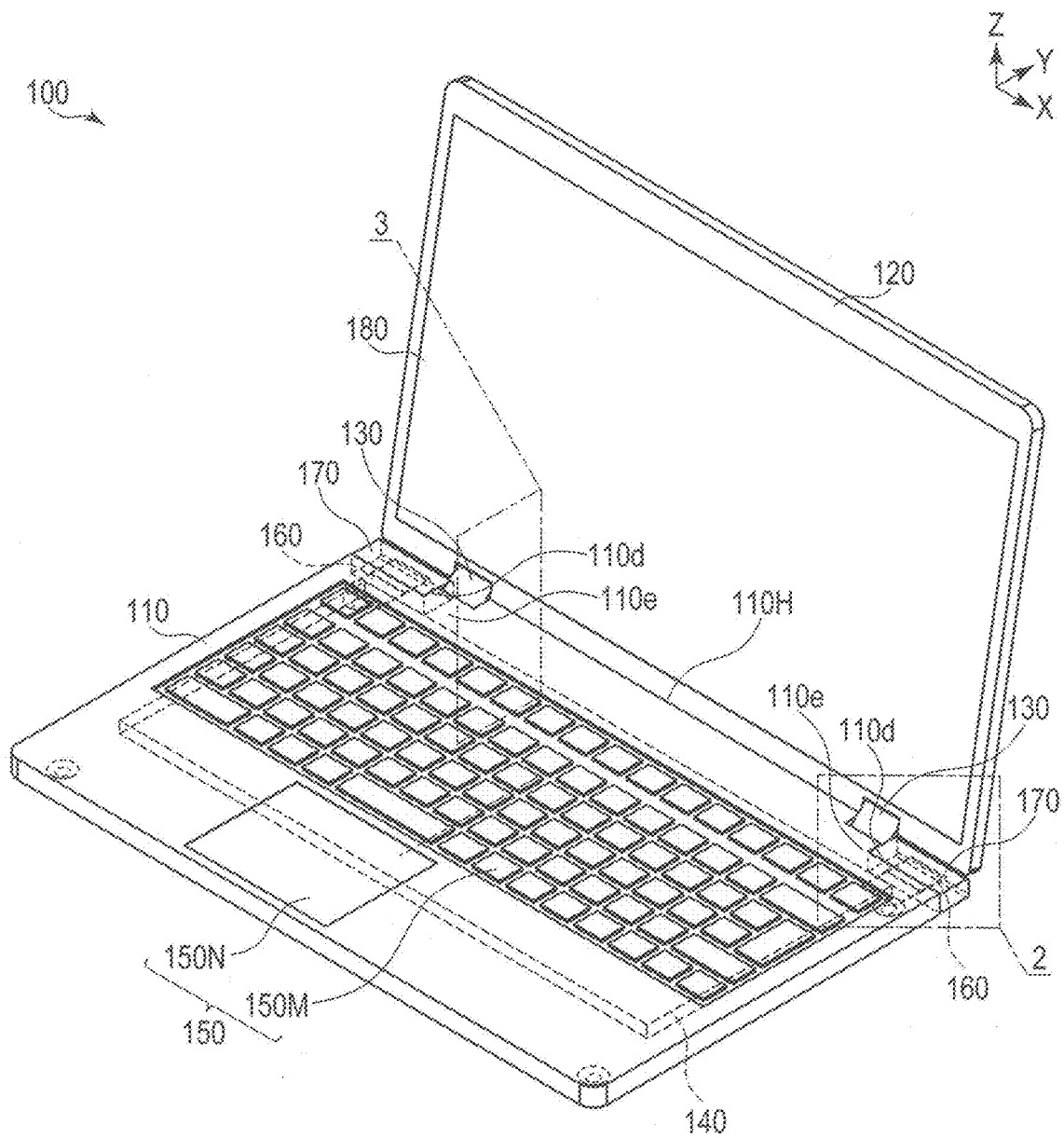
FIG. 1 is a perspective view showing a notebook-sized personal computer 100 of an embodiment.

In general, according to one embodiment, an electronic device is provided with an arithmetic processor, an antenna, a plurality of covers, a first housing, a display, a second housing, and a plurality of coupling members. The arithmetic processor carries out arithmetic calculation. The antenna includes a plurality of antenna elements connected to the arithmetic processor. The antenna elements are capable of transmitting/receiving a radio wave. The covers respectively accommodate each of the antenna elements. At least a portion of a cover opposed to an antenna element accommodated is comprised of a material able to pass the radio wave. The first housing retains the arithmetic processor, the antenna, and the covers. The display displays information output by the arithmetic processor. The second housing retains the display. The coupling members rotatably couple the first housing and the second housing to each other. In the first housing, a pair of depression sections are formed by depressing both ends of one side thereof. In at least one of the pair of depression sections, the antenna element is accommodated. To a pair of end sections respectively adjacent to the pair of depression sections along the one side of the first housing, the coupling members are respectively provided.

Various embodiments will be described hereinafter with reference to the accompanying drawings. Note that the disclosure has been presented by way of example only, and the contents described in the following embodiments are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted by identical reference symbols, and detailed descriptions are omitted in some cases. In each drawing, the width direction X, depth direction Y, and height direction Z of a notebook-sized personal computer 100 are indicated by arrows.

Figure 2:
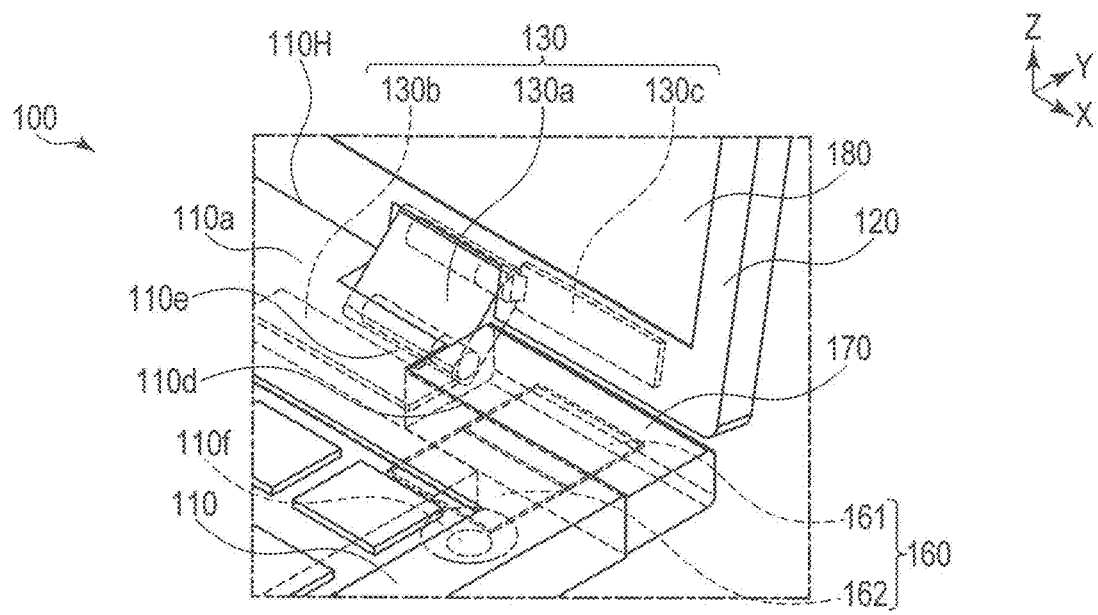
FIG. 2 is an enlarged perspective view showing an area 2 of FIG. 1.
Figure 3:
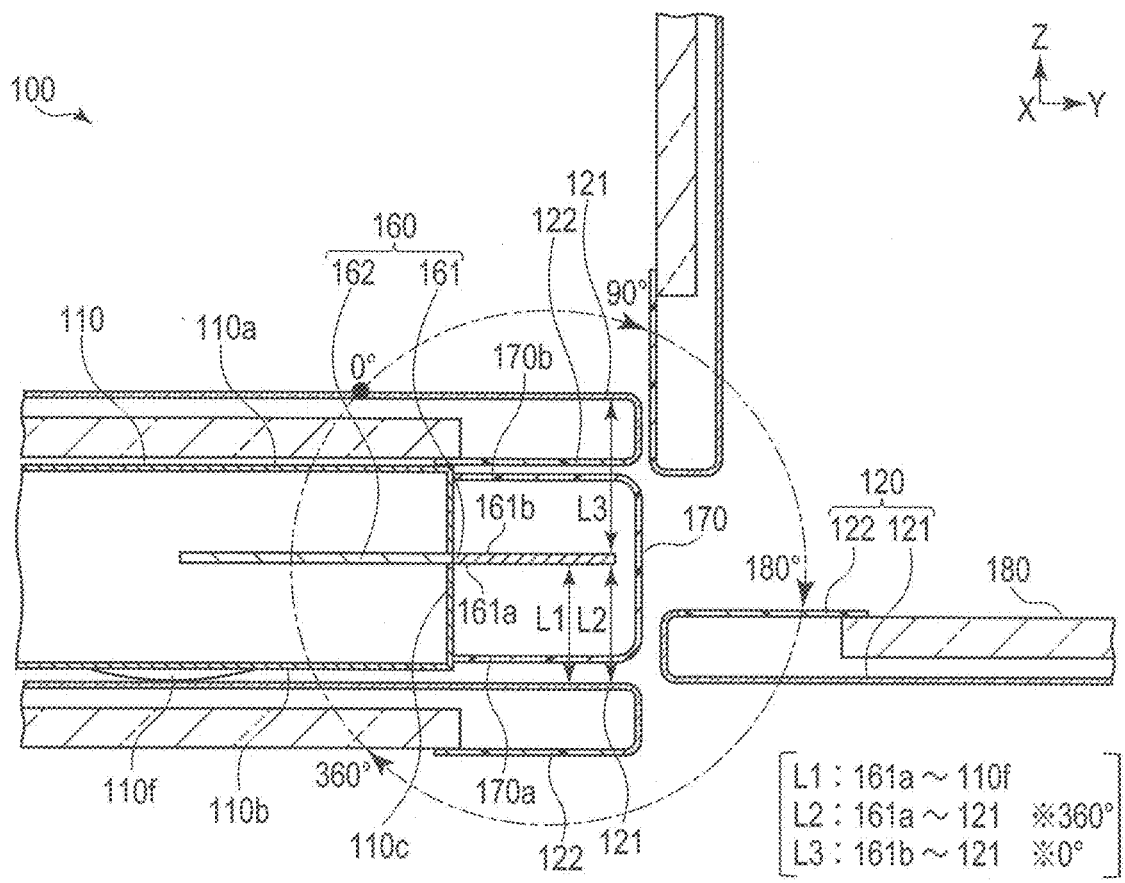
FIG. 3 is an enlarged end view showing a state in an area 3 of FIG. 1 where the notebook-sized personal computer 100 is closed, and states where the computer 100 is opened at angles of 90°, 180°, and 360°.

With reference to FIG. 1 through FIG. 3, the configuration of the notebook-sized personal computer 100 will be described below.

In the notebook-sized personal computer 100 (referred to as an electronic device in Claims), a base housing 110 (referred to as a first housing in Claims) and a LCD housing 120 (referred to as a second housing in Claims) are rotatably coupled to each other by means of hinges 130 (referred to as coupling members in Claims). In or on the base housing 110, an arithmetic unit 140, an input unit 150, an antenna 160, and a cover 170 are retained. In the LCD housing 120, an LCD 180 (referred to as a display member in Claims) is retained. The base housing 110 and the LCD 180 constituting the notebook-sized personal computer 100 will be described below in sequence in the order mentioned.

As shown in FIG. 1, the base housing 110 retains therein or thereon the arithmetic unit 140, the antenna 160, and the covers 170. As shown in FIG. 1 and FIG. 2, in the base housing 110, a pair of depression sections 110d formed by depressing parts at both ends of one side 110H are formed. In each of the pair of depression sections 110d, an antenna element 161 is accommodated. On the base housing 110, to end sections 110e adjacent to the pair of depression sections 110d along the one side 110H, the hinges 130 are rotatably coupled.

The base housing 110 is formed into a box-like shape in which an upper surface section 110a and a lower surface section 110b are opposed to each other through a side surface section 110c (110b and 110c are shown in FIG. 3). On the upper surface section 110a side, the input unit 150 is provided. At four corners on the lower surface section 110b side, foot sections 110f are formed. The base housing 110 is constituted of a metal.

As shown in FIG. 1 through FIG. 3, the LCD housing 120 retains therein the LCD 180. The LCD housing 120 supports the LCD 180 from the rear surface side thereof by means of an LCD cover 121, and supports the outer edges of the LCD from the front surface side thereof by means of an LCD mask 122.

As shown in FIG. 1 and FIG. 2, the hinges 130 rotatably couple the base housing 110 and LCD housing 120 to each other. As shown in FIG. 2, each of the hinges 130 is constituted of a rotating section 130a, first metal fittings 130b fixed to the end section 110e of the base housing 110, and second metal fittings 130c fixed to the outer edge part of the LCD housing 120. When the LCD housing 120 is rotated relatively to the base housing 110 set as a criterion by means of the hinges 130, an angle formed between the LCD housing 120 and the base housing 110 is called an angle of the LCD housing 120 relative to the base housing 110.

The arithmetic unit 140 is shown in FIG. 1 and carries out arithmetic calculation. The arithmetic unit 140 is provided with a circuit board and the like on which a Read Only Memory (ROM), a Central Processing Unit (CPU), a Random Access Memory (RAM), and the like are mounted.

As shown in FIG. 1, the input unit 150 is constituted of a keyboard 150M and a touch pad 150N. Each of the keyboard 150M and the touch pad 150N is provided in the base housing 110 and is connected to the arithmetic unit 140.

As shown in FIG. 1 through FIG. 3, the antenna 160 is provided with an antenna element 161 connected to the arithmetic unit 140 and capable of transmitting/receiving a radio wave, and an antenna ground 162. The antenna element 161 is formed into a plate-like shape, and extends along the one side 110H of the base housing 110. The antenna element 161 is provided in the depression section 110d of the base housing 110. The antenna element 161 is configured to be able to transmit/receive a radio wave from both surfaces (one surface 161a and the other surface 161b) thereof. Note that, the antenna element 161 may also be configured to be able to transmit/receive a radio wave from one surface (one surface 161a or the other surface 161b) thereof as in the case of a general antenna element. The resonance frequency of the antenna element 161 is higher than or equal to the 2.4 GHz band. The antenna ground 162 is supported on the base housing 110. The antenna ground 162 is made conductive in terms of a high frequency by means of screws or double-sided adhesive tape in order to secure a sufficient ground area.

As shown in FIG. 2, the antenna 160 is configured in such a manner that the antenna element 161 thereof provided in the base housing 110 is adjacent to the first metal fittings 130b of the hinge 130 along the one side 110H of the base housing 110, the first metal fittings 130b being provided in the base housing 110. By virtue of such a configuration, the antenna element 161 and hinge 130 are prevented from being opposed to each other and being made to interfere with each other, whereby it is made possible to sufficiently reduce the communication disturbance of the antenna element 161.

In the direction perpendicular to the antenna element 161, a first distance L1 from the antenna element 161 to the farthest point (foot section 110f) of the base housing 110 is greater than or equal to 2.1 mm and less than or equal to 20 mm. Here, as shown in FIG. 3, the first distance L1 is a distance from the antenna element 161 to the foot section 110f on the other side (rear surface side) of the base housing 110. The first distance L1 is set by taking, a distance by which the communication carried out through the antenna element 161 is prevented from being disturbed when a metallic member is in contact with the rear surface side of the base housing 110 of the notebook-sized personal computer 100, into consideration. In the direction perpendicular to the antenna element 161 in a state where the LCD housing 120 is rotated from the base housing 110 by an angle of 360°, a second distance L2 from the antenna element 161 to the LCD cover 121 opposed to the antenna element 161 is greater than or equal to 2.1 mm and less than or equal to 20 mm. In the direction perpendicular to the antenna element 161 in a state where the base housing 110 is closed by the LCD housing 120, a third distance L3 from the antenna element 161 to the LCD cover 121 opposed to the antenna element 161 is greater than or equal to 2.1 mm and less than or equal to 20 mm.

Results of verifying the communication characteristics of the antenna 160 in the 2.4 GHz band and 5.0 GHz band by experiment by variously changing the distance L between the antenna element 161 and the metallic member are shown in Table 1. The results of the verification are one example. As the metallic member, a copper plate was used in the experiment. When the distance L between the antenna element 161 and the metallic member was less than 2.1 mm, the communication characteristics became bad (×). When the distance L between the antenna element 161 and the metallic member was greater than or equal to 2.1 mm and less than 4.2 mm, the communication characteristics became acceptable (Δ). When the distance L between the antenna element 161 and the metallic member was greater than or equal to 4.2 mm and less than 5.0 mm, the communication characteristics became good (○). When the distance L between the antenna element 161 and the metallic member was greater than or equal to 5.0 mm, the communication characteristics became very good (◉).

TABLE 1

| Distance L | L < 2.1 | 2.1 ≤ L < 4.2 | 4.2 ≤ L < 5.0 | 5.0 ≤ L |
|---|---|---|---|---|
| Communication characteristics | X | Δ | ○ | ◉ |

◉: very good,
○: good,
Δ: acceptable,
X: bad

As shown in FIG. 1 through FIG. 3, the cover 170 accommodates therein the antenna elements 161 and is constituted of, for example, plastic through which a radio wave is passed. The cover 170 passes a radio wave through itself from both sides (one surface section 170a and the other surface section 170b) thereof opposed to both the surfaces (one surface 161a and the other surface 161b) of the antenna element 161. The cover 170 is not formed by insert molding, and painting attaching importance to such design intent that the base housing 110 and cover 170 are to be integrated is applied thereto. The cover 170 is provided in such a manner as to cover the depression section 110d of the base housing 110.

As shown in FIG. 1 through FIG. 3, the LCD 180 displays information thereon by means of the arithmetic unit 140. The liquid crystal display (LCD) 180 is an example of a display unit and is a liquid crystal display. As the display unit, an organic electroluminescence display may also be used. The LCD 180 is held in the LCD housing 120.

A usage form 1 of the notebook-sized personal computer 100 will be described below with reference to FIG. 4A and FIG. 4B.

Figure 4A:
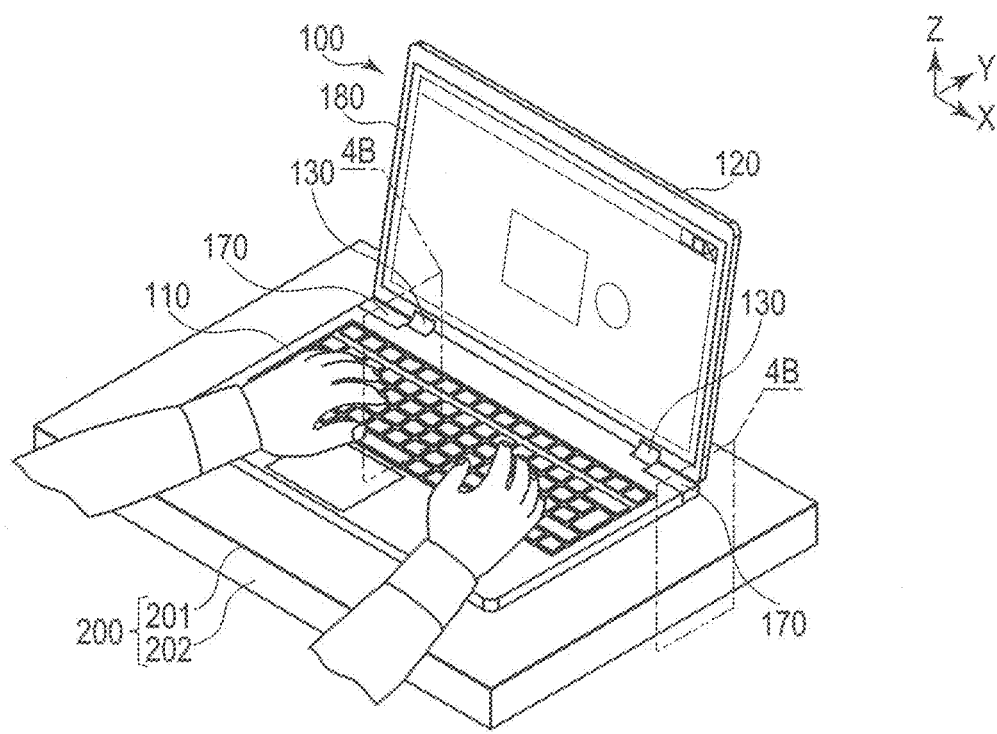
FIG. 4A is a perspective view showing the notebook-sized personal computer 100 in a usage form 1 in a state where the computer 100 is placed on a metallic table 200 with the computer 100 opened at an angle of 100°, and the computer 100 is used by a user carrying out Internet browsing.

As shown in FIG. 4A, in the usage form 1, the notebook-sized personal computer 100 is placed on a metallic table 200 in a state where the computer 100 is opened at an angle of 100°. Here, the notebook-sized personal computer 100 is used by a user carrying out Internet browsing.

Figure 4B:
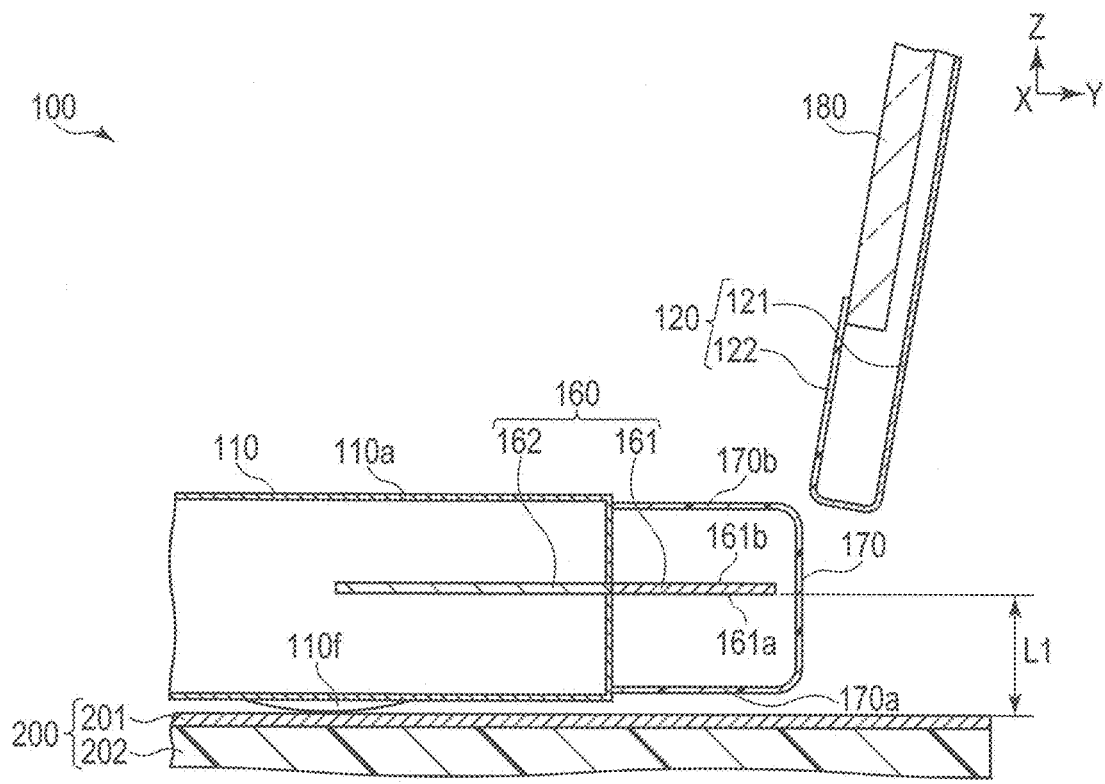
FIG. 4B is an enlarged end view showing an area 4B of FIG. 4A.

As shown in FIG. 4B, beneath the antenna element 161, the metallic table 200 exists. The one surface 161a side of the antenna element 161 is opposed to a top plate 201 of the metallic table 200 through the one surface section 170a of the cover 170. Here, the top plate 201 is formed of a metal, and hence becomes a cause of disturbing communication using a radio wave. The top plate 201 is supported on a supporting member 202 constituted of, for example, wood. However, the position of the antenna element 161 in the base housing 110 is set in such a manner that the first distance L1 between the antenna element 161 and the top plate 201 separates from each other to such a degree that a communication disturbance is not caused in the state where the foot sections 110f of the base housing 110 are in contact with the top plate 201. That is, in the state shown in FIG. 4B, regarding the radio wave to be transmitted/received by the antenna element 161, the influences of shielding and absorption to be caused by the top plate 201 positioned beneath the antenna element 161 are sufficiently reduced.

As shown in FIG. 4B, at least in the upward vicinity of the antenna element 161, no structural object that may cause a communication disturbance is found. The other surface 161b side of the antenna element 161 is opposed to the upper space of the notebook-sized personal computer 100 through the other surface section 170b of the cover 170. That is, in the state shown in FIG. 4B, regarding the radio wave to be transmitted/received by the antenna element 161, the influences of shielding and absorption to be caused at a position above the antenna element 161 are sufficiently reduced.

A usage form 2 of the notebook-sized personal computer 100 will be described below with reference to FIG. 5A and FIG. 5B.

Figure 5A:
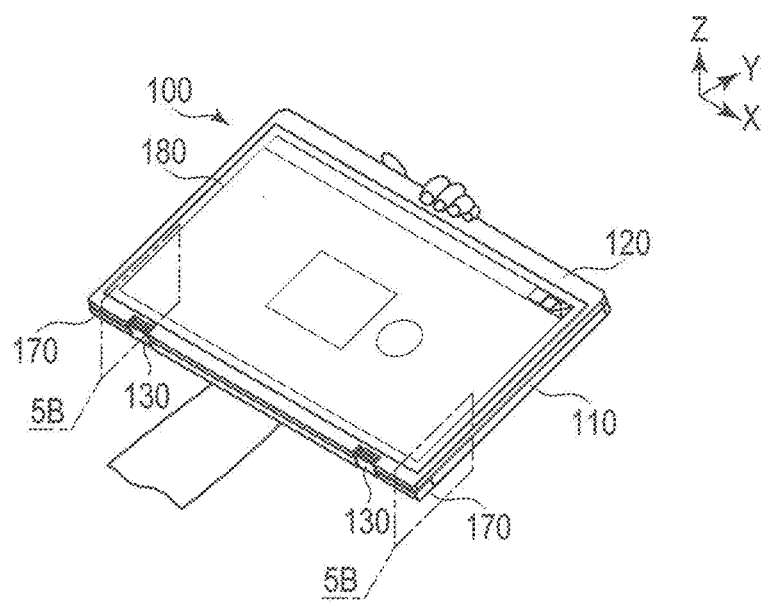
FIG. 5A is a perspective view showing the notebook-sized personal computer 100 in a usage form 2 in a state where the computer 100 is held by the user with the computer 100 opened at an angle of 360°, and the computer 100 is used by the user carrying out Internet browsing.

As shown in FIG. 5A, in the usage form 2, the notebook-sized personal computer 100 is held by the user in a state where the computer 100 is opened at an angle of 360°. Here, the notebook-sized personal computer 100 is used by the user carrying out Internet browsing.

Figure 5B:
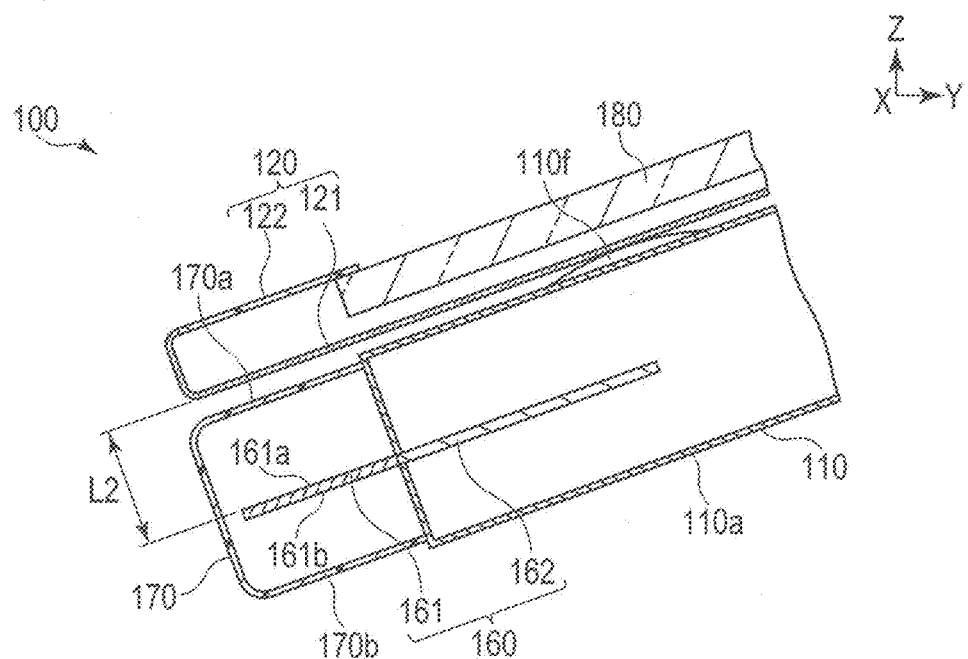
FIG. 5B is an enlarged end view showing an area 5B of FIG. 5A.

As shown in FIG. 5B, at least in the downward vicinity of the antenna element 161, no structural object that may cause a communication disturbance is found. The other surface 161b side of the antenna element 161 is opposed to the lower space of the notebook-sized personal computer 100 through the other surface section 170b of the cover 170. That is, in the state shown in FIG. 5B, regarding the radio wave to be transmitted/received by the antenna element 161, the influences of shielding and absorption to be caused at a position below the antenna element 161 are sufficiently reduced.

As shown in FIG. 5B, above the antenna element 161, the LCD housing 120 exists. The one surface 161a side of the antenna element 161 is opposed to the LCD cover 121 of the LCD housing 120 through the one surface section 170a of the cover 170. Here, the LCD cover 121 is formed of a metal, and hence the LCD cover 121 becomes a cause of disturbing communication using a radio wave. However, the position of the antenna element 161 in the base housing 110 is set in such a manner that the second distance L2 between the antenna element 161 and LCD cover 121 separates from each other to such a degree that a communication disturbance is not caused in the state where the foot sections 110f of the base housing 110 are in contact with the LCD cover 121. That is, in the state shown in FIG. 5B, regarding the radio wave to be transmitted/received by the antenna element 161, the influences of shielding and absorption to be caused by the LCD cover 121 positioned above the antenna element 161 are sufficiently reduced.

A usage form 3 of the notebook-sized personal computer 100 will be described below with reference to FIG. 6A and FIG. 6B.

Figure 6A:
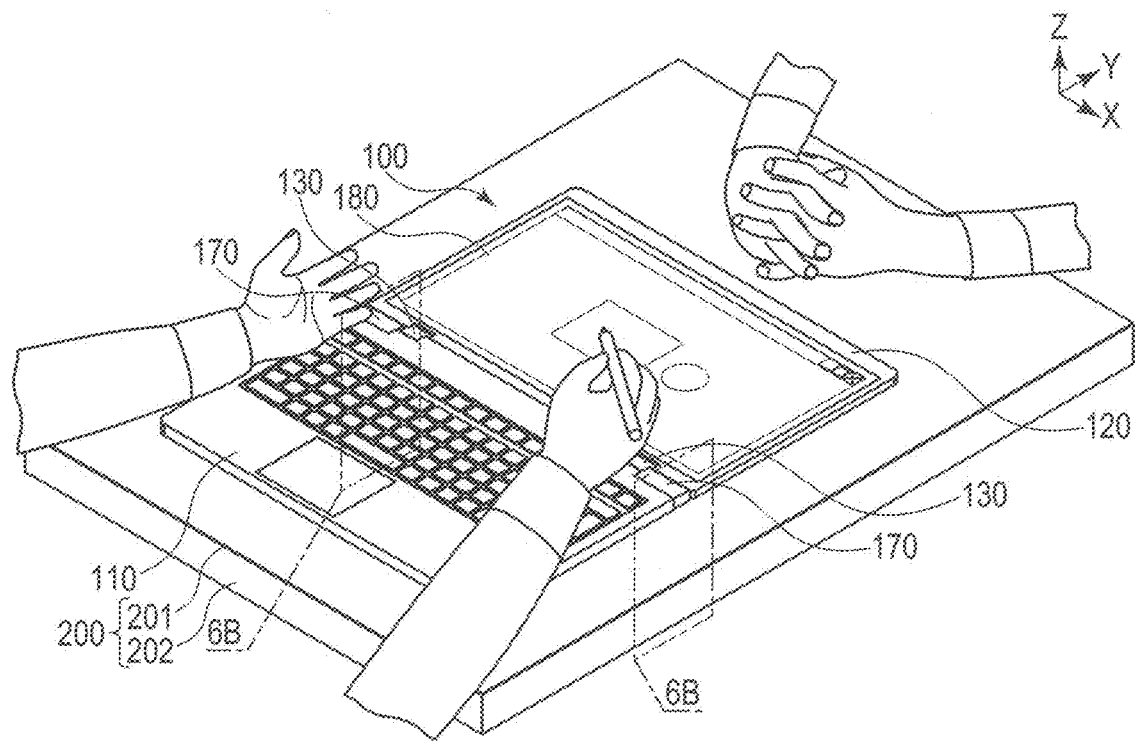
FIG. 6A is a perspective view showing the notebook-sized personal computer 100 in a usage form 3 in a state where the computer 100 is placed on the metallic table 200 with the computer 100 opened at an angle of 180°, and the computer 100 is used by the user making a presentation while carrying out Internet browsing.

As shown in FIG. 6A, in the usage form 3, the notebook-sized personal computer 100 is placed on the metallic table 200 in a state where the computer 100 is opened at an angle of 180°. Here, the notebook-sized personal computer 100 is used by the user (left side in FIG. 6A) and client (right side in FIG. 6A) carrying out Internet browsing. Furthermore, the user is making a presentation to the client.

Figure 6B:
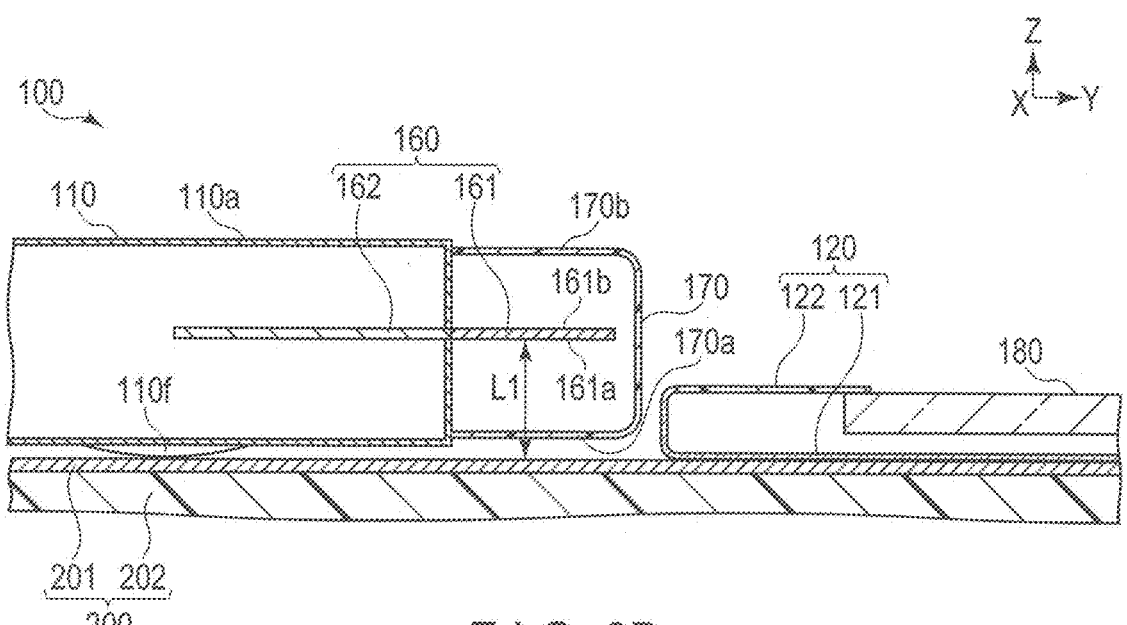
FIG. 6B is an enlarged end view showing an area 6B in FIG. 6A.

As shown in FIG. 6B, beneath the antenna element 161, the metallic table 200 exists. The communication state at a position beneath the antenna element 161 is identical to the state described previously with reference to FIG. 4B. That is, regarding the radio wave to be transmitted/received by the antenna element 161, the influences of shielding and absorption are sufficiently reduced.

As shown in FIG. 6B, at least in the upward vicinity of the antenna element 161, no structural object that may cause a communication disturbance is found. The communication state at a position above the antenna element 161 is identical to the state described previously with reference to FIG. 4B. That is, regarding the radio wave to be transmitted/received by the antenna element 161, the influences of shielding and absorption are sufficiently reduced.

A usage form 4 of the notebook-sized personal computer 100 will be described below with reference to FIG. 7A and FIG. 7B.

Figure 7A:
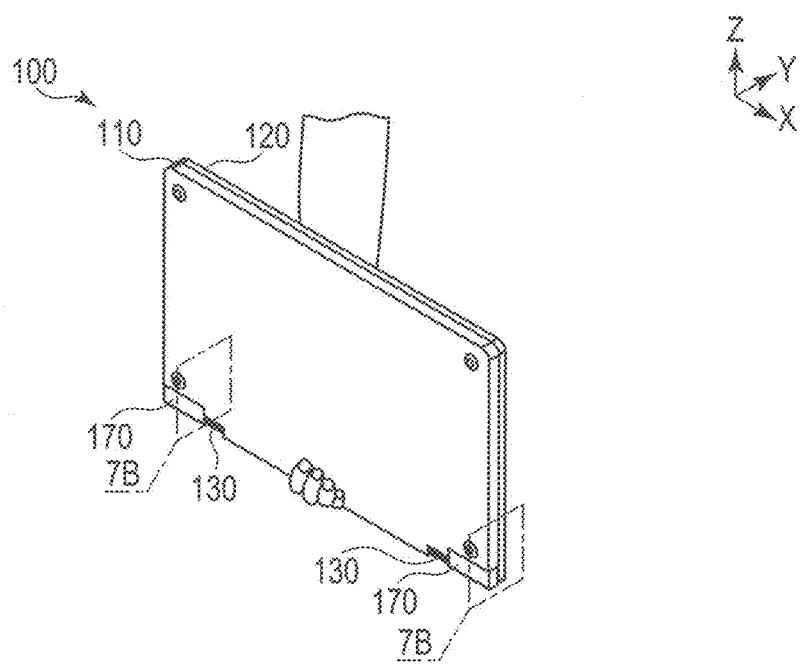
FIG. 7A is a perspective view showing the notebook-sized personal computer 100 in a usage form 4 in a state where the computer 100 is being carried by the user with the computer 100 closed, and connection between the computer 100 and the Internet is continued.

As shown in FIG. 7A, in the usage form 4, the notebook-sized personal computer 100 is carried by the user in a state where the computer 100 is closed. Here, in the notebook-sized personal computer 100, connection to the Internet is continued.

Figure 7B:
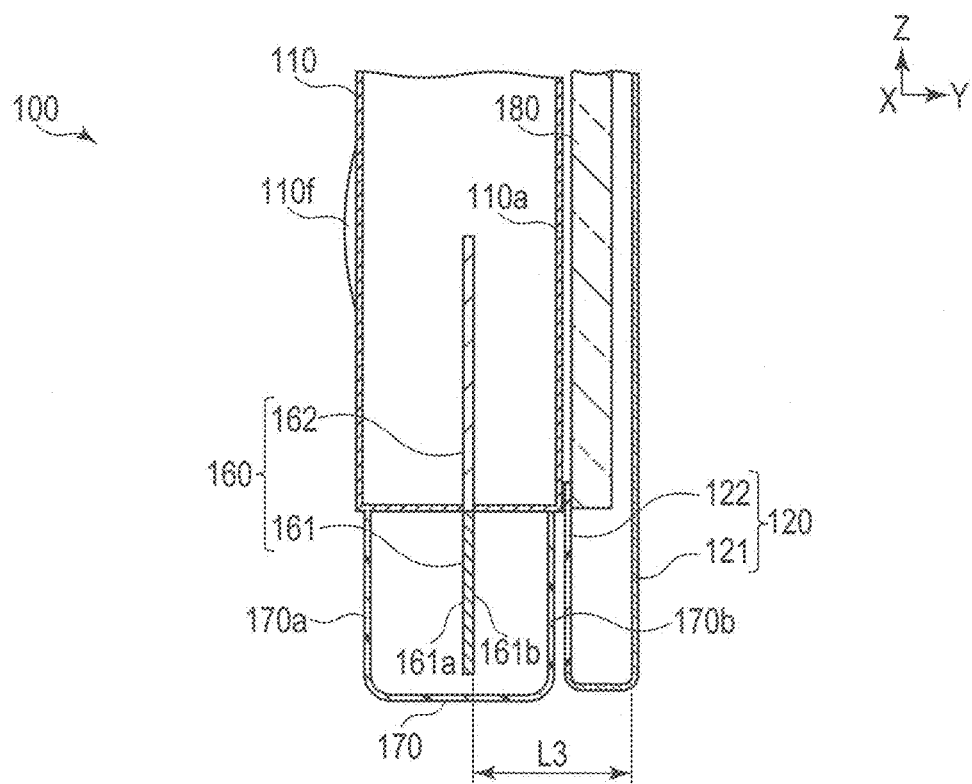
FIG. 7B is an end view showing an area 7B in FIG. 7A.

As shown in FIG. 7B, in the rightward (one side) vicinity of the antenna element 161, the LCD housing 120 exists. The other surface 161b side of the antenna element 161 is opposed to the LCD cover 121 of the LCD housing 120 through the other surface section 170b of the cover 170 and LCD mask 122 of the LCD housing 120. Here, the LCD mask 122 is formed of plastic, and hence does not become a cause of disturbing communication using a radio wave. On the other hand, the LCD cover 121 is formed of a metal, and hence becomes a cause of disturbing communication using a radio wave. However, the position of the antenna element 161 in the base housing 110 is set in such a manner that the third distance L3 between the antenna element 161 and LCD cover 121 separates from each other to such a degree that a communication disturbance is not caused in the state where the upper surface section 110a (farthest point) of the base housing 110 is in the close vicinity of the LCD 180. That is, in the state shown in FIG. 7B, regarding the radio wave to be transmitted/received by the antenna element 161, the influences of shielding and absorption to be caused by the LCD cover 121 positioned on the right of the antenna element 161 are sufficiently reduced.

As shown in FIG. 7B, at least in the leftward (the other side) vicinity of the antenna element 161, no structural object that may cause a communication disturbance is found. The one surface 161a side of the antenna element 161 is opposed to the left space of the notebook-sized personal computer 100 through the one surface section 170a of the cover 170. That is, in the state shown in FIG. 7B, regarding the radio wave to be transmitted/received by the antenna element 161, the influences of shielding and absorption to be caused at a position on the left of the antenna element 161 are sufficiently reduced.

With reference to FIG. 1 through FIG. 7B, advantages of the notebook-sized personal computer 100 will be described below.

According to the embodiment, the base housing 110 retains therein the arithmetic unit 140 together with the antenna 160, and hence connection between the antenna element 161 and arithmetic unit 140 can be maintained without being adversely affected by the rotational operation of the hinge 130. Accordingly, it becomes unnecessary to link the wiring connecting the antenna element 161 and the arithmetic unit 140 to each other with the hinge 130 or reinforce the wiring. As a result, it is possible to simply and easily configure the notebook-sized personal computer 100.

Furthermore, the antenna element 161 is accommodated in each of the pair of depression sections 110d formed at both the ends of the one side 110H of the base housing 110, and to the pair of end sections 110e adjacent to the pair of depression sections 110d, the hinges 130 are coupled. In this configuration, in the base housing 110, the antenna elements 161 are respectively positioned on the outside of the pair of hinges 130. That is, in the base housing 110, the antenna elements 161 are provided in the existing space, whereby the new space is not required. Accordingly, it is possible to provide the antenna 160 in the vacant space of the base housing 110. As a result, it is possible to downsize the notebook-sized personal computer 100.

Furthermore, the antenna element 161 is accommodated in the cover 170 through which a radio wave is passed, and hence it is possible to physically separate the antenna element 161 from a metallic structural object that may disturb communication using a radio wave. Particularly, in this configuration, the antenna element 161 is not exposed from the notebook-sized personal computer 100. Accordingly, it is possible to avoid a communication disturbance resulting from a metallic structural object. As a result, it is possible to maintain the communication state of the notebook-sized personal computer 100 in a favorable condition.

As described above, the notebook-sized personal computer 100 of the embodiment can simply and easily be configured and downsized, and can obtain a good communication state.

According to the embodiment, the base housing 110 is constituted of a metal. By contriving such a configuration, it is possible to further downsize the base housing 110 while maintaining the rigidity of the base housing 110. The base housing 110 is not in opposition to the antenna element 161, and hence it is possible to prevent a communication disturbance from occurring.

According to the embodiment, the antenna element 161 is formed into a plate-like shape, and can transmit/receive a radio wave from at least one of both the surfaces (one surface 161a and the other surface 161b). Particularly, in the embodiment, as an example, the antenna element 161 is configured to be able to transmit/receive a radio wave from both the surfaces. In the case of such a configuration, the cover 170 passes a radio wave through the parts thereof (one surface section 170a and the other surface section 170b) opposed to both the surfaces of the antenna element 161 being capable of transmitting/receiving a radio wave. By contriving such a configuration, it is possible to increase the spatial area through which communication is enabled, and make a communication disturbance unlikely to occur even when a metallic structural object that may cause a communication disturbance exists. Here, when the antenna element 161 is configured in such a manner as to be able to transmit/receive a radio wave from only the one side (one surface 161a or the other surface 161b) thereof, the configuration is contrived in such a manner that a radio wave is radiated from only one side (the one surface 161a or the other surface 161b) capable of making a communication disturbance more unlikely to occur than the other side, according to the assumed possible usage form of the notebook-sized personal computer 100.

According to the embodiment, the resonance frequency of the antenna element 161 is higher than or equal to the 2.4 GHz band. By contriving such a configuration, it is possible to make the width of the antenna element 161 in the width direction X smaller and thereby make the distance between the pair of hinges 130 longer. Note that, the resonance frequency of the antenna element 161 and the width of the antenna element 161 in the width direction X are in inverse proportion to each other. Accordingly, it is possible to sufficiently provide members constituting the notebook-sized personal computer at the part between the pair of hinges 130. That is, in order to keep the part between the right and left hinges 130 larger, it is desirable that the dimensions of the parts outside both the hinges 130 be smaller. Between the right and left hinges 130, for example, a circuit board, a cooling fan, vent holes for the cooling fan, a battery, and the like can be provided as members constituting the notebook-sized personal computer. Here, it was confirmed that, regarding the performance of the antenna 160 by experiment, it is possible to secure the antenna efficiency of −8 dB or more at frequencies in the frequency band higher than or equal to the 2.4 GHz band.

According to the embodiment, in the direction perpendicular to the antenna element 161, the first distance L1 from the antenna element 161 to the farthest point (foot section 110f) of the base housing 110 is greater than or equal to 2.1 mm and less than or equal to 20 mm. Furthermore, desirably, the lower limit value of the first distance L1 is greater than or equal to 5.0 mm. By contriving such a configuration (greater than or equal to 2.1 mm, desirably, greater than or equal to 5.0 mm), for example, in the state shown in FIG. 4B where the LCD housing 120 is rotated from the base housing 110 by an angle of 100°, regarding the radio wave to be transmitted/received by the antenna element 161, the influences of shielding and absorption to be caused by the top plate 201 positioned in the vicinity of the antenna element 161 are sufficiently reduced. Further, by contriving such a configuration (less than or equal to 20 mm), it is possible to make the thickness of the base housing 110 sufficiently smaller.

Likewise, for example, in the state shown in FIG. 6B where the LCD housing 120 is rotated from the base housing 110 by an angle of 180°, regarding the radio wave to be transmitted/received by the antenna element 161, the influences of shielding and absorption to be caused by the top plate 201 positioned in the vicinity of the antenna element 161 are sufficiently reduced. Further, by contriving such a configuration (less than or equal to 20 mm), it is possible to make the thickness of the base housing 110 sufficiently smaller.

According to the embodiment, in the direction perpendicular to the antenna element 161 in a state where the LCD housing 120 is rotated from the base housing 110 by an angle of 360°, the second distance L2 from the antenna element 161 to the LCD cover 121 (opposed to the antenna element 161) is greater than or equal to 2.1 mm and less than or equal to 20 mm. Furthermore, desirably, the lower limit value of the second distance L2 is greater than or equal to 5.0 mm. By contriving such a configuration (greater than or equal to 2.1 mm, desirably, greater than or equal to 5.0 mm), in the state shown in FIG. 5B, regarding the radio wave to be transmitted/received by the antenna element 161, the influences of shielding and absorption to be caused by the LCD cover 121 positioned in the vicinity of the antenna element 161 are sufficiently reduced. Further, by contriving such a configuration (less than or equal to 20 mm), it is possible to make the thickness of the base housing sufficiently smaller.

According to the embodiment, in the direction perpendicular to the antenna element 161 in a state where the base housing 110 and LCD housing 120 are closed, the third distance L3 from the antenna element 161 to the LCD cover 121 (opposed to the antenna element 161) is greater than or equal to 2.1 mm and less than or equal to 20 mm. Furthermore, desirably, the lower limit value of the third distance L3 is greater than or equal to 5.0 mm. By contriving such a configuration (greater than or equal to 2.1 mm, desirably, greater than or equal to 5.0 mm), in the state shown in FIG. 7B, regarding the radio wave to be transmitted/received by the antenna element 161, the influences of shielding and absorption to be caused by the LCD cover 121 positioned in the vicinity of the antenna element 161 are sufficiently reduced. Further, by contriving such a configuration (less than or equal to 20 mm), it is possible to make the thickness of the base housing 110 sufficiently smaller.

Further, by providing the cover 170 configured to cover the antenna element 161 on the outside of the hinge 130, insert molding of the base housing is made unnecessary. As a result, it has become possible to manufacture the base housing 110 at low cost and within a short time. Here, in the 5G-equipped notebook-sized personal computer, it is expected that four WWAN antennas will be installed. In this case, it is high possibility that a WLAN antenna mounted on the outside of the hinge 130 will be a standard.

Further, the antenna 160 is mounted on the outside of the hinges 130 of the base housing 110. Mounting the antenna 160 outside the hinges 130 requires no passing of a cable through each hinge 130, and even when the angle of the LCD 180 is 0° or 360°, the communication performance can be secured, and hence mounting the antenna 160 outside the hinges 130 is very desirable. Furthermore, the manufacturing workability of the notebook-sized personal computer 100 has been improved, and it has been made possible to eliminate the risk of a break in the antenna cable at the time of usage of the notebook-sized personal computer 100. Further, it has been made possible to make insert molding of the notebook-sized personal computer 100 unnecessary while maintaining excellent design, and hence it has been made possible to reduce manufacturing cost and tact time. Furthermore, bezel slimming of the notebook-sized personal computer 100 has been achieved. When it is temporarily assumed that a WiFi (registered trade mark) antenna is mounted on the LCD housing side, in order that only the antenna section may have a plastic housing, insert molding becomes indispensable, and hence the manufacturing cost and tact time are increased, and mounting the antenna causes bezel broadening.

Further, the mounting position of the antenna 160 is limited to the outside of the hinge 130 of the base housing 110, and hence even when the LCD 180 is closed (LCD angle 0°) or even when the LCD 180 is opened at an angle of 360° (LCD angle 360°), i.e., even when the notebook-sized personal computer 100 is used as a tablet, it is possible to maintain the antenna performance.

In the direction perpendicular to the antenna element 161, the first distance L1 from the antenna element 161 to the farthest point of the base housing 110 is the distance from the antenna element 161 to the foot section 110f on the rear surface side of the base housing 110, but the first distance L1 also corresponds to the distance from the antenna element 161 to the upper surface section 110a on the upper surface side of the base housing 110.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   an arithmetic processor that carries out arithmetic calculation;
      an antenna comprising a plurality of antenna elements connected to the arithmetic processor, the antenna elements being able to transmit or receive a radio wave;
   a plurality of covers configured to respectively accommodate each of the antenna elements, at least a portion of a cover opposed to an antenna element accommodated comprising a material able to pass the radio wave;
   a first housing configured to retain the arithmetic processor, the antenna, and the covers;
   a display that displays information output by the arithmetic processor;
   a second housing configured to retain the display; and
   a plurality of coupling members configured to rotatably couple the first housing and the second housing to each other, wherein
   the first housing comprises a pair of depression sections formed by depressing two ends of one side of the first housing,
   the antenna element is accommodated in at least one of the pair of depression sections,
   the coupling members are respectively provided to a pair of end sections respectively adjacent to the pair of depression sections along the one side of the first housing,
   the antenna element is formed into a plate-like shape and extended along the one side of the first housing, and
   in a direction perpendicular to a surface of the plate-like shape of the antenna element, a first distance from the surface of the antenna element to the farthest point of the first housing is greater than or equal to 2.1 mm and less than or equal to 20 mm.

2. The electronic device of claim 1, wherein the first housing comprises a metal.

3. The electronic device of claim 1, wherein
the antenna element is formed into a plate-like shape having two surfaces, and able to transmit or receive the radio wave from at least one of the two surfaces, and
the portion of the cover opposed to the at least one of the two surfaces of the antenna element is able to pass the radio wave.

4. The electronic device of claim 1, wherein a resonance frequency of the antenna element is higher than or equal to the 2.4 GHz band.

5. The electronic device of claim 1, wherein a lower limit value of the first distance is greater than or equal to 5.0 mm.

6. The electronic device of claim 1, wherein
the antenna element is formed into a plate-like shape and extended along the one side of the first housing,
the second housing comprises a metal member, and
in a direction perpendicular to a surface of the plate-like shape of the antenna elements, a second distance from the surface of the antenna element to the metal member opposed to the surface of the antenna element is greater than or equal to 2.1 mm and less than or equal to 20 mm, when the second housing is rotated from the first housing by an angle of 360°.

7. The electronic device of claim 6, wherein a lower limit value of the second distance is greater than or equal to 5.0 mm.

8. The electronic device of claim 1, wherein
the antenna element is formed into a plate-like shape and extended along the one side of the first housing,
the second housing comprises a metal member, and
in a direction perpendicular to a surface of the plate-like shape of the antenna element, a third distance from the surface of the antenna element to the metal member opposed to the surface of the antenna element is greater or equal to 2.1 mm and less than or equal to 20 mm, when the first housing and the second housing are closed.

9. The electronic device of claim 8, wherein a lower limit value of the third distance is greater than or equal to 5.0 mm.

10. An electronic device comprising:
an arithmetic processor that carries out arithmetic calculation;
an antenna comprising a plurality of antenna elements connected to the arithmetic processor, the antenna elements being able to transmit or receive a radio wave;
a plurality of covers configured to respectively accommodate each of the antenna elements, at least a portion of a cover opposed to an antenna element accommodated comprising a material able to pass the radio wave;
a first housing configured to retain the arithmetic processor, the antenna, and the covers;
a display that displays information output by the arithmetic processor;
a second housing configured to retain the display; and
a plurality of coupling members configured to rotatably couple the first housing and the second housing to each other, wherein
the first housing comprises a pair of depression sections formed by depressing two ends of one side of the first housing,
the antenna element is accommodated in at least one of the pair of depression sections,
the coupling members are respectively provided to a pair of end sections respectively adjacent to the pair of depression sections along the one side of the first housing,
the antenna element is formed into a plate-like shape and extended along the one side of the first housing,
the second housing comprises a metal member, and
in a direction perpendicular to a surface of the plate-like shape of the antenna elements, a second distance from the surface of the antenna element to the metal member opposed to the surface of the antenna element is greater than or equal to 2.1 mm and less than or equal to 20 mm, when the second housing is rotated from the first housing by an angle of 360°.

11. The electronic device of claim 10, wherein a lower limit value of the second distance is greater than or equal to 5.0 mm.

12. The electronic device of claim 10, wherein the first housing comprises a metal.

13. The electronic device of claim 10, wherein
the antenna element is formed into a plate-like shape having two surfaces, and able to transmit or receive the radio wave from at least one of the two surfaces, and
the portion of the cover opposed to the at least one of the two surfaces of the antenna element is able to pass the radio wave.

14. The electronic device of claim 10, wherein a resonance frequency of the antenna element is higher than or equal to the 2.4 GHz band.

15. An electronic device comprising:
an arithmetic processor that carries out arithmetic calculation;
an antenna comprising a plurality of antenna elements connected to the arithmetic processor, the antenna elements being able to transmit or receive a radio wave;
a plurality of covers configured to respectively accommodate each of the antenna elements, at least a portion of a cover opposed to an antenna element accommodated comprising a material able to pass the radio wave;
a first housing configured to retain the arithmetic processor, the antenna, and the covers;
a display that displays information output by the arithmetic processor;
a second housing configured to retain the display; and
a plurality of coupling members configured to rotatably couple the first housing and the second housing to each other, wherein
the first housing comprises a pair of depression sections formed by depressing two ends of one side of the first housing,
the antenna element is accommodated in at least one of the pair of depression sections,
the coupling members are respectively provided to a pair of end sections respectively adjacent to the pair of depression sections along the one side of the first housing,
the antenna element is formed into a plate-like shape and extended along the one side of the first housing,
the second housing comprises a metal member, and
in a direction perpendicular to a surface of the plate-like shape of the antenna element, a third distance from the surface of the antenna element to the metal member opposed to the surface of the antenna element is greater or equal to 2.1 mm and less than or equal to 20 mm, when the first housing and the second housing are closed.

16. The electronic device of claim 15, wherein a lower limit value of the third distance is greater than or equal to 5.0 mm.

17. The electronic device of claim 15, wherein the first housing comprises a metal.

18. The electronic device of claim 15, wherein
the antenna element is formed into a plate-like shape having two surfaces, and able to transmit or receive the radio wave from at least one of the two surfaces, and
the portion of the cover opposed to the at least one of the two surfaces of the antenna element is able to pass the radio wave.

19. The electronic device of claim 15, wherein a resonance frequency of the antenna element is higher than or equal to the 2.4 GHz band.

* * * * *